3,733,387
PREPARATION OF FINELY PARTICULATE SILICON DIOXIDE
Tibor Kugler, Sins, and Jakob Silbiger, Basel, Switzerland, assignors to Lonza Ltd., Gampel, Valais, Switzerland
Original application Mar. 12, 1970, Ser. No. 18,902. Divided and this application Dec. 6, 1971, Ser. No. 205,166
Claims priority, application Switzerland, Mar. 31, 1969, 4,826/69
Int. Cl. C01b 33/18, 33/00
U.S. Cl. 423—33 C    6 Claims

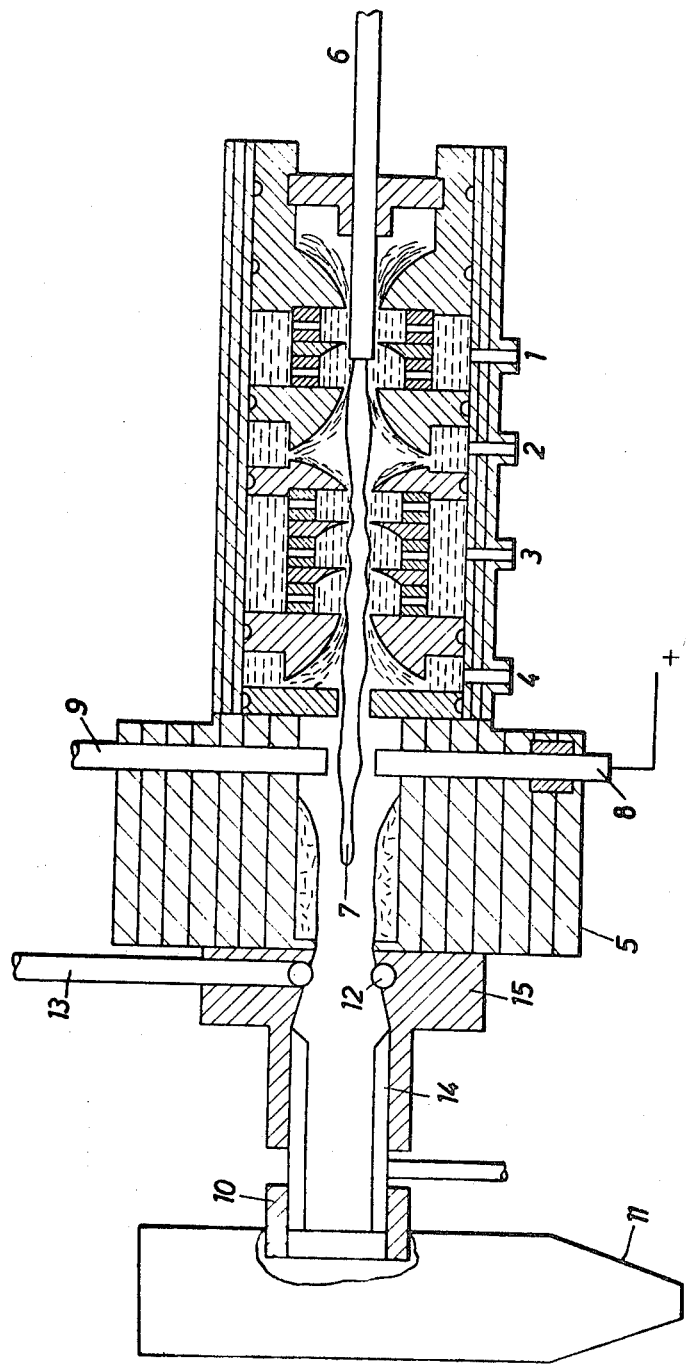

ABSTRACT OF THE DISCLOSURE

Finely particulate silicon oxides are produced from coarse particulate silicon dioxide using a liquid stabilised plasma burner. Hydrocarbons are used as the stabilising liquid, and the coarse particulate silicon dioxide is reduced by the hydrocarbon plasma jet leaving the plasma burner, and a part of the hydrocarbon which is evaporated and decomposed in the arc zone is withdrawn together with the liquid hydrocarbon stabilising medium, which is recycled, separated from the liquid, and used as carrier gas for feeding the coarse particulate silicon dioxide. Finely particulate silicon monoxide is initially formed, and may be recovered as such, or oxidised at the anode of the plasma burner to silicon dioxide.

CROSS-REFERENCE TO RELATED APPLICATION

This application is a division of our copending application Ser. No. 18,902, filed Mar. 12, 1970, now Pat. 3,649,189, issued Mar. 14, 1972. This application is also related to the following applications owned by the same assignee as the present application: Tibor Kugler and Jakob Silbiger, Ser. No. 885,927, filed Dec. 17, 1969, now Pat. 3,649,497, issued Mar. 14, 1972; Tibor Kugler, Ser. No. 68,628, filed Sept. 1, 1970; Tibor Kugler, Ser. No. 43,014, filed June 3, 1970, now abandoned; Tibor Kugler, Ser. No. 228,880, filed Feb. 24, 1972; Tibor Kugler and Jakob Silbiger, Ser. No. 885,929, filed Dec. 17, 1969, now Pat. 3,658,673, issued Apr. 25, 1972; Tibor Kugler, Ser. No. 42,809, filed June 2, 1970, now Pat. 3,665,244, issued May 23, 1972; and Tibor Kugler and Jakob Silbiger, Ser. No. 205,250, filed Dec. 6, 1971.

The present invention relates to a process for the production of very finely particulate silicon oxides from coarse particulate silicon dioxide by means of a liquid-stabilised plasma burner.

It has previously been proposed to produce silicon monoxide from silicon dioxide by partial reduction with solid carbon in an arc furnace or an electric furnace. The process is sometimes carried out under reduced pressure to lower the temperature required.

It has also been proposed that the silicon dioxide and the reduction coke used for the reaction are compressed and baked in the form of arc electrodes, after they have been intimately mixed together. The necessary heat is supplied by an electric arc or arcs, which burn between the electrodes.

It has furthermore been proposed to produce silicon oxide by heating a mixture of silicon dioxide and silicon metal.

With the previously proposed methods, finely particulate silicon dioxide, silicon monoxide or mixtures thereof occur as reaction products, which may also contain metallic silicon, depending on the quenching conditions to which the gases leaving the reaction zone are subjected. In order to obtain sufficiently pure end products, it is necessary to use not only a very pure silicon dioxide as starting material but also pure solid carbon, which in general can only be obtained by coking or even graphitisation. The intimate mixing and/or compression and baking of the starting material is an expensive operation, and one which can be performed only by a large expenditure of energy and materials. The previously proposed methods have the further disadvantage that they have a relatively low material throughout and thus a relatively low energy yield.

An object of the present invention is to mitigate the above disadvantages of the previously proposed methods, i.e. to produce more finely divided silicon oxides by a less energy consumption.

The present invention provides a process for the production of very finely particulate silicon oxides from coarse particulate silicon dioxide, by means of a liquid stabilised plasma burner in which hydrocarbons are used as stabilising liquid, wherein the reduction of the coarse particulate silicon dioxide is carried out by the hydrocarbon plasma jet leaving the plasma burner, and a part of the hydrocarbon stabilising liquid evaporated and decomposed in the arc zone is withdrawn together with the liquid hydrocarbon stabilising medium which is recycled, separated from the liquid, and used as carrier gas for feeding in the coarse particulate silicon dioxide.

The finely particulate silicon monoxide produced by the process of the invention can be recovered as such, but it is also possible to convert this initially formed silicon monoxide at the anode into silicon dioxide by re-oxidation. In this way a finely divided silicon dioxide is obtained.

The re-oxidation of the initially formed silicon monoxide can be caried out with water and/or carbon dioxide.

In the process of the invention the plasma burner is stabilised by liquid hydrocarbons, which simultaneously act as plasma gas. In other words a plasma of hydrocarbon is formed which effects the reduction of the silicon dioxide. Liquid hydrocarbons having a high carbon/hydrogen ratio are preferably selected in order to raise the energy yields by decreasing the amount of hydrogen. Such hydrocarbons are preferably those having a carbon content of more than 10 carbon atoms per molecule, i.e. benzene and higher fractions of crude oil distillation.

Quartz sand is preferably used as silicon dioxide. Thus for example a sand may be used which is suitable for the production of glass. The granulation may be within rather wide limits, but it is preferable not to exceed a grain size of 150–200 mesh.

The silicon dioxide is most advantageously added in the vicinity of the anode, directly into the plasma jet. The gaseous hydrocarbon which is separated from the liquid stabilisation medium is used as carrier gas for feeding the silicon dioxide.

Also according to the present invention, apparatus for carrying out the process comprises a liquid stabilised plasma burner with an anode, a conduit in the vicinity of the anode for introducing coarse particulate silicon dioxide, an axially directed insulating vessel located after the anode and bounded in the radial direction, a quenching device, at least one withdrawal means and charging means for the stabilising liquid and a separating device for separating the gases and vapours contained in the stabilising liquid, which are used after separation as carrier gas for the supply of the coarse particulate $SiO_2$.

The anode preferably comprises carbon. For re-oxidation a re-oxidation space having at least one inlet is preferably used between the insulating vessel and the quenching device. The quenching device is preferably arranged to be axially displaceable.

One embodiment of the invention will now be described by way of example and with reference to the accompanying drawing.

The liquid-stabilised plasma burner with a cathode 6 and an anode 8 is charged with liquid hydrocarbon through openings 1 and 3. This liquid hydrocarbon circulates and is withdrawn through openings 2 and 4. The liquid hydrocarbon is freed of the gaseous entrained fraction in a separator (not shown), the fraction being used for charging the silicon dioxide. The plasma jet burns between the cathode 6 and the anode 8. The coarse-particled silicon dioxide is led into the plasma jet through a tube 9 by means of hydrocarbon carrier gas. A reaction vessel 5, which is gas-tight and is secured to the wall of the plasma burner, is arranged parallel to the plasma flow axis and at right angles to the anode 8. This extends up to the outlet opening of the burner. A plasma jet 7 flows into the reaction vessel over the base surface of the anode 8. This preferably comprises a thermally insulated carbon, graphite, silicon carbide or quartz cylinder. There is an inlet tube 9 in the plane of the anode for the powdery, large-grained silicon dioxide. The re-oxidation spray 12 is arranged after the reaction vessel 5. The quenching spray 14 is axially adjustably arranged in the cooled tubular pieces 10 and 13. The switching device 11 is connected to this apparatus.

After the slicon dioxide has been fed in the granules are entrained by the plasma jet and accelerated in the direction of the anode 8 to the separator 11. Reduction to gaseous silicon dioxide, accompanied by simultaneous heating, begins on the surface of the particles. The heated particles radiate a considerable amount of heat, and thus rapidly bring the reduction to completion. Since the reaction space comprises an insulated body with cylindrical internal openings, some of the silicon dioxide powder particles are thrown, in the molten state, against this internal wall by the plasma jet, before completion of the reduction, and there form a very viscous film, which moves in the direction of the separator under the influence of the impulse imparted by the jet. In this way it is further reduced to silicon monoxide gas by the components of the jet, so that at the end of the reaction space the silicon dioxide layer has been completely consumed. The amount of silicon dioxide powder added is controlled so that there is no accumulation of molten quartz at the outlet of the reaction space. A gas stream comprising silicon monoxide, carbon monoxide and hydrogen, as well as possible excess hydrocarbon, flows from the reaction space in the direction of the separator.

The temperature of this gas mixture should preferably be kept above 2300° C. by controlling the addition of energy to the burner, in order to avoid undesired side reactions in this section, as for example the formation of silicon carbide. The back-oxidation can be carried out at the outlet of the reaction vessel by adding water and/or carbon dioxide through a circular shower device having radial inwardly directed openings. Basically, any substance or mixture which contains elementary or chemically combined oxygen is suitable for the back-oxidation, provided that the energy of formation is smaller than the free energy of oxidation of silicon monoxide to dioxide, and no difficultly separable components are formed in the final mixture by the reaction. However, as already mentioned water or steam and/or carbon dioxide are preferably used.

The back-oxidation vessel 15 is located after the back-oxidation shower, the length of the vessel 15 being chosen corresponding to the desired particle size of the silicon dioxide being formed. After the desired particle size has been achieved, preferably 10–20 m$\mu$, the suspension of particles in the reaction gases passes to the quenching shower 14. At this point a cooling agent, preferably a vaporisable liquid or a polyatomic gas, is blown in radially at a high rate for quenching. Water, carbon dioxide or hydrogen are preferably used. After the quenching the solid particles are separated from the gas components in a separating device.

If silicon monoxide is to be prepared, back-oxidation is to be avoided as much as possible. In this case the circular nozzle 12 is disconnected. As quenching agent a gas is used which cannot oxidse the silicon monoxide formed, i.e. an inert gas or hydrogen is used. Preferably the quenching shower 14 is moved in the apparatus up to the end of the reduction space.

EXAMPLES (1) A liquid hydrocarbon, e.g. fuel oil, is added to a liquid-stabilised plasma burner as stabilising agent. Under the influence of the arc burning between the inner graphite cathode and the rod-shaped graphite anode located in the reaction vessel, a part of the fuel oil evaporates and also partially dissociates, and is converted into the plasma state. A part of these vapours and gases is withdrawn together with the stabilising liquid through the slit in front of the cathode and possibly also the anode, is separated from the liquid by the suction rotary pump in a centrifugal gas separator, and is passed to the gas inlet of the pneumatic powder conveyor. The larger part of the plasma formed, which is enveloped by a stream of hot carbon-containing gases and vapours, flows into the reaction vessel 5 over the graphite anode. Powdered quartz sand containing 98% silicon dioxide is introduced from the powder conveyer by means of the hydrocarbon gas stream, through the pipe 9, into the stream flowing from the burner. The powder particles are already partially reduced in the course of their journey by the carbon content of the jet to gaseous silicon monoxide, with the simultaneous formation of carbon monoxide. The remainder of the powder particles is melted and is thrown, in the molten state, onto the walls of the quartz tube 5 on account of the turbulence of the jet. The wall is streaked with a very viscous layer which is further distributed by the jet and reduced to gaseous silicon oxide. The jet leaving the quartz tube comprises gaseous silicon monoxide, carbon oxide and hydrogen. A conduit in the form of a circular shower with radial opening directed inwardly is arranged at the end of the quartz tube. Steam is added as back-oxidising agent through this conduit. Water for quenching is injected through a further series of radial openings. A re-oxidation to silicon dioxide starts after the circular shower, and lasts up to the quenching zone, where the back-oxidation ceases on account of the much lower temperature. Fine solid powder present in the gas suspension is separated in a separating device after the quenching zone. 12 kg. of very finely divided $SiO_2$ having a diameter of less than 1 are obtained per hour with a burner output of 120 kwh. and a supply of powdered sand of 13.2 kg./hour.

(2) The circular nozzle is disconnected from the apparatus illustrated in Example 1. Gaseous hydrogen is fed in through the quenching opening for the purpose of quenching. The re-oxidation reaction cannot occur in this method of operation on account of the lack of oxygen, since the quenching zone is moved up to the quartz tube. After quenching, very finely divided silicon monoxide is obtained in a stream of carbon monoxide and hydrogen, from which the silicon monoxide is then separated after cooling. The silicon monoxide is formed at a rate of 10 kg./hour at an output of 120 kwh., and has a monoxide content of 98%.

Silicon dioxide is formed according to the process of the invention with a high energy yield. This is achieved by using hydrocarbons as plasma, i.e. the principal reduction operation is effected by the elements carbon and hydrogen present in the plasma, the main work of reduction being performed by carbon.

We claim:

1. A process for the production of very finely particulated silicon dioxide from coarsely particulated silicon dioxide, which comprises:

(a) passing the coarsely particulated silicon dioxide with a recycled hydrocarbon carrier gas into the vicinity of the anode of a circulating hydrocarbon liquid-stabilized plasma burner and directly into an elongated plasma jet, said jet being produced by evaporating and decomposing a portion of the liquid stabilizing liquid in the arc zone, and flowing said combined mixture into an adjacent reaction zone to produce therein a gas stream at a temperature of at least about 2,300° C. and comprising silicon monoxide, carbon monoxide, and hydrogen;

(b) withdrawing and separating entrained unreacted gaseous and liquid portions of the hydrocarbon stabilizing medium and recycling the gaseous portion as carrier gas for feeding the coarsely particulated silicon dioxide into the process, and recycling the liquid portion into the burner;

(c) passing an oxygen containing media into the gas stream and oxidizing the silicon monoxide component to silicon dioxide; and (d) cooling the gas stream containing silicon dioxide to obtain very finely particulated silicon dioxide.

2. The process as set forth in claim 1 in which the oxygen containing media passed into the gas stream in the oxidizing step is chosen from the group consisting of water, steam or carbon dioxide.

3. The process as set forth in claim 1 in which said cooling step includes quenching the silicon dioxide after it is formed with an agent that can oxidize silicon monoxide.

4. The process as set forth in claim 3 in which the agent used in the quenching step is chosen from the group including water or carbon dioxide.

5. The process as set forth in claim 1 in which, after the cooling step, the finely particulated silicon dioxide is recovered from the gas stream.

6. The process as set forth in claim 1 in which the step of passing the oxygen containing media into the gas stream comprises spraying the media into the gas stream.

References Cited

UNITED STATES PATENTS 3,649,189   3/1972   Kugler _____ 23—182 V

EDWARD STERN, Primary Examiner

U.S. Cl. X.R.

433—335, 337; 204—164